(12) United States Patent
Kim

(10) Patent No.: US 12,725,508 B2
(45) Date of Patent: Sep. 1, 2026

(54) MEASURING DEVICE AND CONTROL SYSTEM INCLUDING THE SAME

(71) Applicant: Tae-Heon Kim, Daejeon (KR)

(72) Inventor: Tae-Heon Kim, Daejeon (KR)

( * ) Notice: Subject to any disclaimer, the term of this patent is extended or adjusted under 35 U.S.C. 154(b) by 25 days.

(21) Appl. No.: 19/240,286

(22) Filed: Jun. 17, 2025

(65) Prior Publication Data

US 2026/0105831 A1 Apr. 16, 2026

(30) Foreign Application Priority Data

Oct. 14, 2024 (KR) ........................ 10-2024-0139236

(51) Int. Cl.
*G08B 25/00* (2006.01)
*G08B 21/10* (2006.01)
*H04L 67/12* (2022.01)

(52) U.S. Cl.
CPC ........... *G08B 25/009* (2013.01); *G08B 21/10* (2013.01); *H04L 67/12* (2013.01)

(58) Field of Classification Search
CPC ........ G08B 25/009; G08B 21/10; H04L 67/12
See application file for complete search history.

(56) References Cited

U.S. PATENT DOCUMENTS 6,735,630 B1 * 5/2004 Gelvin ..................... G01V 1/22 709/200
9,392,548 B2 * 7/2016 Lee ..................... H04W 52/367
12,283,172 B2 * 4/2025 Dawes ................... G08B 25/10
12,335,055 B2 * 6/2025 Hyakudai ......... H04L 12/40039
2017/0142687 A1 * 5/2017 Kim ...................... H04W 72/23

FOREIGN PATENT DOCUMENTS

KR 10-2016-0064417 A 6/2016
KR 10-2022-0043334 A 4/2022
KR 10-2450327 B1 10/2022

OTHER PUBLICATIONS

Office Action issued Nov. 25, 2024 in Korean Application No. 10-2024-0139236.

* cited by examiner

*Primary Examiner* — John A Tweel, Jr.
(74) *Attorney, Agent, or Firm* — Sughrue Mion, PLLC

(57) ABSTRACT

A measuring device is provided. The measuring device is disposed at a designated location, which is an arbitrary place, and includes: a sensing module configured to sense surrounding information related to surrounding conditions; a first communication module configured to communicate with a control server; a second communication module configured to communicate with another measuring device located within a predetermined distance; a control module configured to control the first or second communication module according to a predefined control method such that alert information is transmitted to the control server when the surrounding information satisfies a predefined alert condition; and a housing unit to which the sensing module, the first and second communication modules, and the control module are connected.

10 Claims, 9 Drawing Sheets

MEASURING DEVICE AND CONTROL SYSTEM INCLUDING THE SAME

CROSS-REFERENCE TO RELATED APPLICATION

This application is based on and claims priority under 35 U.S.C. § 119 to Korean Patent Application No. 10-2024-0139236, filed on Oct. 14, 2024, in the Korean Intellectual Property Office, the disclosure of which is incorporated by reference herein in its entirety.

FIELD OF THE INVENTION

The present invention relates to a measuring device capable of monitoring and responding to surrounding environments.

BACKGROUND OF THE INVENTION

Responding to disaster situations, especially natural disasters such as wildfires, is critically important, and various monitoring and response systems have been developed along with technological advancements. These systems typically utilize sensors and communication modules to detect disaster situations and issue alerts accordingly. Because disasters such as wildfires are difficult to predict and require rapid response when they occur, technologies that can monitor such conditions in real time and issue alerts are crucial.

However, conventional disaster response systems are highly dependent on communication infrastructure, making timely transmission of disaster information difficult in environments where communication networks are limited or unstable. For example, in areas such as mountains, deserts, and forests where communication is unstable, it is difficult to transmit disaster information, and there have been problems where alerts are delayed or not delivered due to communication failures. Additionally, existing devices had the problem of consuming a large amount of battery power, and when a disaster lasted for an extended period, the devices could fail to operate properly, resulting in a failure in disaster response.

Related Art Documents

Patent Document

Korean Patent Publication No. 10-2022-0043334, published on Apr. 5, 2022

SUMMARY OF THE INVENTION

The present invention has been made to solve the aforementioned problems, and provides a measuring device capable of quickly transmitting disaster information with low power consumption, and a control system including the same.

A measuring device according to an embodiment of the present invention is disposed at a designated location, which is an arbitrary place, and comprises: a sensing module configured to sense surrounding information, which is information related to surrounding conditions; a first communication module configured to perform information communication with a control server; a second communication module configured to perform information communication with another measuring device disposed within a predetermined distance from the designated location; a control module configured to control the first communication module or the second communication module according to a predefined control method so that alert information is transmitted to the control server when the surrounding information satisfies a predefined alert condition; and a housing unit to which the sensing module, the first communication module, the second communication module, and the control module are connected.

The predefined control method may be a method for controlling the first communication module or the second communication module to: first preemptively communicate directly with the control server; and then communicate with the control server via another measuring device if direct communication with the control server is unavailable.

The control module may activate the first communication module, which is deactivated, so as to directly transmit the alert information to the control server when the second communication module receives the alert information.

The control module may control the first communication module or the second communication module according to the predefined control method when the second communication module receives the alert information. The alert information may include identification information for identifying another measuring device that sensed confirmation information, which is the surrounding information satisfying the predefined alert condition, and intermediary information regarding another measuring device that transmitted the confirmation information.

The control module may control the first communication module and the second communication module in one of: a deep sleep mode in which the first communication module is deactivated and the second communication module is in standby; a sleep mode in which the first communication module is deactivated and the second communication module is activated; and an active mode in which both the first communication module and the second communication module are activated.

The control module may switch from the deep sleep mode to the active mode when the surrounding information satisfies a predefined alert condition.

The control module may control the sensing module such that a sensing period of the surrounding information in the sleep mode is shorter than that in the deep sleep mode, and may switch from the active mode to the sleep mode when a predefined sleep condition is satisfied.

The control module may transmit a disaster signal to a terminal within a predetermined distance via a short-range communication method if a response is not received from the control server within a predetermined time after the alert information is transmitted to another measuring device.

The measuring device may further comprise a power module disposed in the housing unit and configured to supply electrical energy to the sensing module, the first communication module, the second communication module, or the control module. The control module may switch from the deep sleep mode to the active mode when the alert information is received from another measuring device, and may switch from the deep sleep mode to the sleep mode when the predefined sleep condition is satisfied, even if the alert information is received from another measuring device.

The alert information may include: identification information for identifying another measuring device that sensed confirmation information, which is the surrounding information satisfying a predefined alert condition; and intermediary information regarding another measuring device that transmitted the confirmation information. The predefined sleep condition may be a condition in which both electrical energy stored in the power module is less than or equal to a predetermined threshold, and the number of other measuring devices that transmitted the confirmation information is less than or equal to a predetermined number.

The control module may switch from the deep sleep mode to the active mode when the alert information is received from another measuring device, even if the predefined sleep condition is satisfied, if a predefined exception condition determined in consideration of weather is satisfied.

A control system according to an embodiment of the present invention comprises: a measuring device deployed at a designated location which is an arbitrary place; and a control server capable of communicating with a plurality of measuring devices. The measuring device includes: a sensing module configured to sense surrounding information related to surrounding conditions; a first communication module configured to perform information communication with the control server; a second communication module configured to perform information communication with another measuring device disposed within a predetermined distance from the designated location; a control module configured to control the first communication module or the second communication module according to a predefined control method so that alert information is transmitted to the control server when the surrounding information satisfies a predefined alert condition; and a housing unit to which the sensing module, the first communication module, the second communication module, and the control module are connected.

Advantageous Effects

The measuring device according to the present invention may enable rapid response to disaster situations.

In addition, it may allow stable transmission of information even in environments with limited communication infrastructure.

Furthermore, it may effectively prevent the spread of a disaster.

However, the effects of the present invention are not limited to those described above, and other effects not explicitly mentioned will be clearly understood by those skilled in the art from the present specification and the accompanying drawings.

BRIEF DESCRIPTION OF THE DRAWINGS

FIG. 7 is a diagram illustrating an example of a predefined control method implemented by the control module of the measuring device according to an embodiment of the present invention.

FIG. 9 is a diagram illustrating an example of another predefined control method implemented by the control module of the measuring device according to another embodiment of the present invention.

DESCRIPTION OF THE INVENTION

Figure 1:
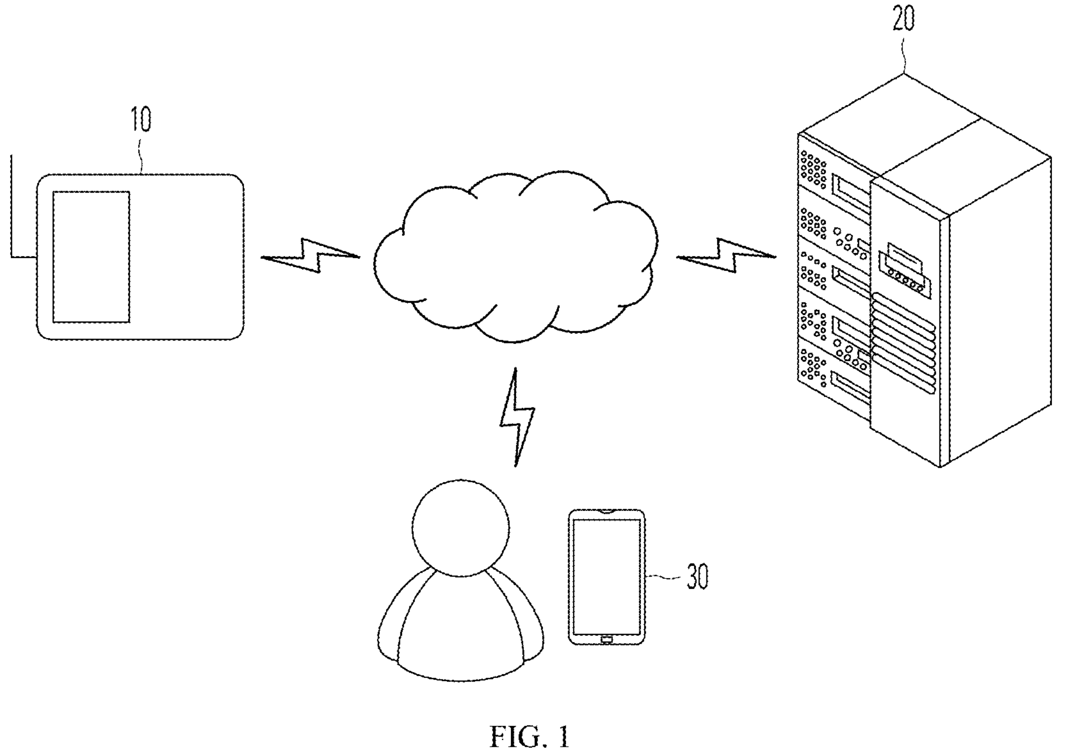
FIG. 1 is a diagram illustrating a relationship among components of a measuring device according to an embodiment of the present invention.

Hereinafter, specific embodiments of the present invention will be described in detail with reference to the accompanying drawings. However, the spirit of the present invention is not limited to the disclosed embodiments. Rather, it should be understood by those skilled in the art that various modifications, additions, and substitutions may be made without departing from the scope and spirit of the invention, and such alternatives also fall within the scope of the present invention.

The same reference numerals are used for components having the same function within the scope of the same concept shown in the drawings of each embodiment.

FIG. 1 is a diagram illustrating the relationship among components of a measuring device according to an embodiment of the present invention.

Referring to FIG. 1, a measuring device 10 according to an embodiment of the present invention may be wirelessly connected to a control server 20 and a terminal 30 through a network.

The term "wireless network" as used herein may refer to a core network integrated with a wired public network, a wireless mobile communication network, or a mobile Internet, and may further include a global open computer network structure providing various services existing on or above the TCP/IP protocol layer, such as Hyper Text Transfer Protocol (HTTP), Hyper Text Transfer Protocol Secure (HTTPS), Telnet, File Transfer Protocol (FTP), Domain Name System (DNS), and Simple Mail Transfer Protocol (SMTP). The wireless network may also encompass any data communication network capable of transmitting and receiving data in various formats and is not limited to the examples described.

The measuring device 10 may be connected to the control server 20 through a long-range communication method such as 4G LTE, 5G, 6G, LTE-M, or LoRa.

The measuring device 10 may also be connected to another measuring device or a terminal 30 through a short-range communication method such as NB-IOT, UWB, or LoRa.

The measuring device 10 may be a computing device.

The terminal 30 may refer to a terminal used or managed by an administrator or a responder.

A terminal used or managed by an administrator or a responder may refer to a terminal registered with the control server.

The terminal 30 may also include a general-purpose terminal used by a member of the public, other than the administrator or the responder.

A general-purpose terminal used by a member of the public may refer to a terminal not registered with the control server.

The terminal 30, as referred to herein, may be a portable computing device capable of performing information processing operations.

Examples of such computing devices may include mobile terminals such as smartphones, personal digital assistants (PDAs), portable multimedia players (PMPs), tablets, notebook computers, and other handheld devices.

Hereinafter, the term "terminal 30" may encompass portable computing devices used by an administrator, a responder, or a member of the public. The term "administrator" may also include the terminal 30, and similarly, the terms "responder" and "member of the public" may be interpreted to include the terminal 30.

The terminal 30 may receive disaster information, alert signals, or emergency signals from the measuring device 10 or the control server 20.

A terminal 30 registered with the control server 20 may be capable of bidirectional communication with the control server 20, thereby allowing the administrator or responder to transmit and receive necessary information and respond accordingly.

Additionally, a terminal 30 that is not registered with the control server 20 may receive a specific protocol from the measuring device 10 or the control server 20 when the measuring device detects a disaster.

When a terminal 30 that is not registered with the control server 20 receives a specific protocol from the measuring device 10 or the control server 20, the terminal 30 may automatically process disaster information at an operating system and transmit it to the measuring device 10 or the control server 20.

For example, when a terminal 30 that is not registered with the control server 20 receives a specific protocol from the measuring device 10 or the control server 20, the terminal 30 may relay communication between the measuring device 10 and the control server 20.

For example, when a terminal 30 that is not registered with the control server 20 receives a specific protocol from the measuring device 10 or the control server 20, the terminal 30 may propagate the disaster alert to another nearby general user terminal.

However, the behavior performed by a terminal 30 that is not registered with the control server 20 upon receiving a specific protocol from the measuring device 10 or the control server 20 is not limited to the aforementioned examples, and may be modified in various ways that would be readily apparent to those skilled in the art.

An administrator may be a person responsible for monitoring disaster situations and establishing response strategies, and may perform analysis and management of disaster information through the control server 20.

The term "administrator" may be used to distinguish from a responder, who takes direct action on-site upon receiving disaster situation information via the measuring device 10 and the control server 20, and from a member of the public, who does not directly engage in disaster response activities on-site.

A responder may be a person who is dispatched to the field to directly respond to a disaster situation, and may receive disaster information through the control server 20 and take necessary actions on-site.

For example, the responder may be a person engaged in firefighting or a related profession.

A member of the public may be an individual who is present within the communication range of the measuring device 10 or the control server 20 either during daily activities or by chance, and who is not obligated to respond to a disaster situation.

For example, the member of the public may include residents, company employees, students, or tourists.

The control server 20 may refer to a device that provides necessary information for monitoring and responding to disaster situations.

In addition, the control server 20 may be capable of communicating with a plurality of measuring devices 10.

The control server 20, as referred to in the present invention, may include other components required to perform the server environment of the control server 20. The control server 20 may encompass any form of device.

For example, the control server 20 may be a digital device equipped with a processor and memory, such as a laptop computer, notebook, desktop, web pad, or mobile phone.

In some cases, the control server 20 may be implemented as a web server or a cloud server.

However, the type of control server 20 is not limited thereto and may be modified in various ways as would be apparent to those skilled in the art.

The control server 20 may refer to a server connected to an institution that performs actions and management for prompt response and dissemination of information in disaster situations.

Figure 2:
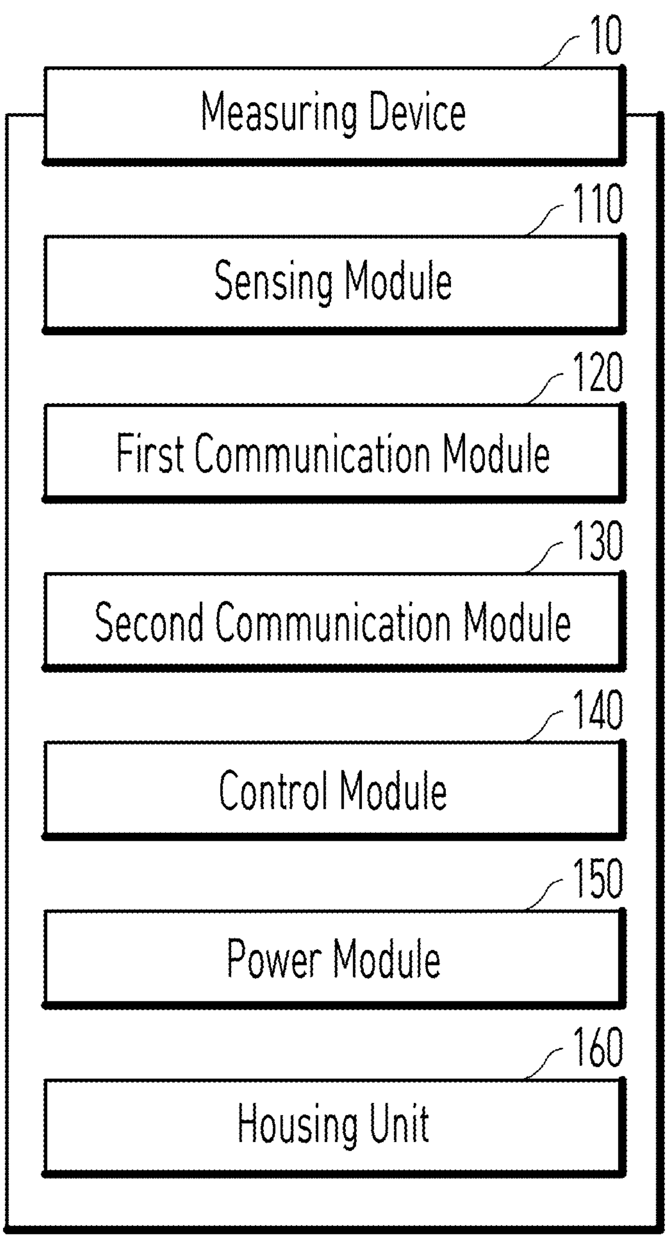
FIG. 2 is a block diagram showing the configuration of the measuring device according to an embodiment of the present invention.

Referring to FIG. 2, a measuring device 10 according to an embodiment of the present invention may be installed at a designated location and may include: a sensing module 110 configured to sense environmental information related to the surrounding conditions; a first communication module 120 configured to perform data communication with a control server; a second communication module 130 configured to perform data communication with another measuring device located within a predetermined distance of the designated location; a control module 140 configured to control the first communication module 120 or the second communication module 130 according to a predefined control method such that, when the surrounding information satisfies a predefined alert condition, alert information is transmitted to the control server; and a housing 160 to which the sensing module 110, the first communication module 120, the second communication module 130, and the control module 140 are connected.

The measuring device 10 may further include a power module 150 disposed within the housing 160 and configured to supply electrical energy to the sensing module 110, the first communication module 120, the second communication module 130, or the control module 140.

The sensing module 110 may sense surrounding information related to environmental conditions.

The environmental conditions may include, for example, temperature, humidity, pressure, vibration, wind direction, and wind speed at the designated location where the measuring device 10 is installed.

In some cases, the environmental conditions may further include objective information determined based on quantitative criteria.

Objective information may be an index by which an occurrence of a fire can be determined according to clear criteria, such as a concentration of smoke particles, an amount of infrared emission, or an amount of ultraviolet emission at the designated location.

In other words, the sensing module 110 may collect information regarding physical and environmental characteristics at the designated location where the measuring device 10 is installed.

The surrounding information may include data regarding an environment or specific conditions at the designated location.

Surrounding information may be related to environmental conditions, including temperature, humidity, pressure, vibration, wind direction, and wind speed.

For example, the surrounding information may further include objective information concerning smoke, ultraviolet radiation, or infrared radiation.

For example, the surrounding information may include data for detecting harmful gases.

The sensing module 110 may include various sensors configured to measure environmental conditions.

For example, the sensing module 110 may include at least one of a temperature sensor, a humidity sensor, a pressure sensor, a gas sensor, a vibration sensor, a fire-detection sensor, or an anemometer.

For example, the fire-detection sensor may include at least one of a smoke sensor, an infrared sensor, or an ultraviolet sensor.

For example, the term "surrounding" may refer to an area within a predetermined distance (e.g., 5 meters) from the measuring device. However, the specific value of the predetermined distance is not limited thereto and may be modified in various ways as would be apparent to those skilled in the art.

The sensing cycle at which the sensing module 110 senses the surrounding information may differ depending on whether the measuring device 10 is in a deep sleep mode, a sleep mode, or an active mode.

For example, the sensing cycle in the deep sleep mode may range from 1 minute to 10 minutes.

For example, the sensing cycle in the sleep mode may range from 10 seconds to 1 minute.

For example, the sensing cycle in the active mode may range from 1 second to 5 seconds.

The sensing module 110 may transmit the surrounding information to the control module 140.

The control module 140 may receive surrounding information, which is information related to the surrounding conditions, from the sensing module 110.

When the surrounding information satisfies a predefined alert condition, the control module 140 may generate alert information based on confirmation information, which corresponds to the surrounding information that satisfies the predefined alert condition.

The confirmation information may include the surrounding information that satisfies a predefined alert condition and a time at which the surrounding information was sensed.

The predefined alert condition may be satisfied when the temperature information included in the surrounding information exceeds a predetermined threshold.

For example, the predefined alert condition may be satisfied when the temperature information included in the surrounding information exceeds 70° C.

The predefined alert condition may be satisfied when the gas information included in the surrounding information exceeds a certain hazard level.

For example, the predefined alert condition may be satisfied when the carbon monoxide concentration in the gas information exceeds 400 ppm.

The predefined alert condition may be satisfied when the vibration information included in the surrounding information deviates from a predetermined range.

For example, the predefined alert condition may be satisfied when the vibration information included in the surrounding information deviates from 0.5 to 1.0 g.

The predefined alert condition may be satisfied when the objective information included in the surrounding information exceeds a certain level of smoke particle concentration in the air.

For example, the predefined alert condition may be satisfied when the objective information included in the surrounding information exceeds 0.3% to 1%/ft of smoke concentration in the air.

Additionally, the predefined alert condition may be satisfied when ultraviolet radiation within a predetermined range is detected in the objective information included in the surrounding information.

For example, the predefined alert condition may be satisfied when ultraviolet radiation in the range of 280 to 300 nm is detected within 0.25 seconds.

Additionally, the predefined alert condition may be satisfied when the amount of infrared radiation within a predetermined range is detected in the objective information included in the surrounding information.

For example, the predefined alert condition may be satisfied when infrared radiation with a wavelength of 2.7 to 4.3 μm is detected.

The alert information may include confirmation information, which is the surrounding information satisfying the predefined alert condition; identification information for identifying the measuring device that sensed the confirmation information; and intermediary information regarding another measuring device that transmitted the confirmation information.

A more detailed description of the information included in the alert information will be provided below.

The control module 140 may control the first communication module 120 or the second communication module 130 according to a predefined control method, so that the alert information is transmitted to the control server.

For example, the predefined control method may include first attempting direct communication with the control server, and if such direct communication is not possible, controlling the first communication module 120 or the second communication module 130 to communicate with the control server via another measuring device.

In other words, the predefined control method may be a method for controlling the first communication module or the second communication module to first preemptively communicate directly with the control server; and then communicate with the control server via another measuring device if direct communication with the control server is unavailable.

The control module 140 may control the first communication module 120 and the second communication module 130 to operate in one of the following modes: a deep sleep mode in which the first communication module 120 is deactivated and the second communication module 130 is in a standby state; a sleep mode in which the first communication module 120 is deactivated and the second communication module 130 is activated; and an active mode in which both the first communication module 120 and the second communication module 130 are activated.

The deep sleep mode may be a mode in which the measuring device operates when initially placed at a designated location, wherein the sensing module is activated, the first communication module is deactivated, and the second communication module is in a standby state.

Here, the term "standby" for the second communication module may mean that it is capable of receiving information but is not capable of transmitting information.

The deep sleep mode may be a mode in which the sensing module performs sensing at the longest interval among all operating modes of the measuring device.

The active mode may be a mode entered when the sensing module of the measuring device installed at a designated location senses surrounding information that satisfies a predefined alert condition, and in this mode, all components of the measuring device are activated regardless of power consumption.

Additionally, the active mode may be entered when the measuring device receives alert information from another measuring device that has sensed surrounding information satisfying a predefined alert condition. In this case, the alert information transmitted from the other measuring device may act as a trigger requesting the measuring device to activate and attempt communication with the control server.

Among the operating modes of the measuring device, the sensing module may perform sensing at the shortest interval when in the active mode.

The sleep mode may be a mode entered for a predetermined period after the active mode ends, in preparation for the possible recurrence of the same or other disaster situations after a disaster has been resolved.

The measuring device switched to the sleep mode may have the first communication module deactivated, and the second communication module and the sensing module may be activated.

When the second communication module is activated, both transmission and reception of information may be possible.

The second communication module may be capable of local communication (i.e., short-range communication) only.

The period during which the measuring device operates in the sleep mode may be remotely set by the control server based on information collected by the control server regarding the presence or absence of sensor abnormalities and the remaining battery levels of each measuring device.

That is, the measuring device may enter the sleep mode only when the remaining battery level exceeds a predetermined threshold. The predetermined threshold may be 50%, although the present invention is not limited thereto.

If surrounding information satisfying the predefined alert condition is sensed by the sensing module during the predetermined period in which the measuring device operates in the sleep mode, the measuring device may transition from the sleep mode back to the active mode.

If surrounding information satisfying the predefined alert condition is not sensed by the sensing module during the predetermined period in which the measuring device operates in the sleep mode, the measuring device may transition from the sleep mode to the deep sleep mode.

The control module 140 may switch from the deep sleep mode to the active mode when the surrounding information satisfies a predefined alert condition.

That is, when the sensing module 110 senses the surrounding information that satisfies the predefined alert condition and the control module 140 receives the surrounding information, the control module 140 may generate alert information based on the surrounding information and switch from the deep sleep mode to the active mode according to a predefined control method.

The control module 140 may control the first communication module 120 or the second communication module 130 according to the predefined control method when the second communication module 130 receives the alert information.

For example, when the second communication module 130 receives the alert information, the control module 140 may activate the deactivated first communication module 120 so that the alert information can be directly transmitted to the control server.

That is, when the second communication module 130 receives the alert information, the control module 140 may switch from the deep sleep mode to the active mode and activate both the first communication module 120 and the second communication module 130 so that the first communication module 120 can directly transmit the alert information to the control server.

A detailed description of the predefined control method will be provided below.

If the control module 140 fails to receive a response from the control server within a predetermined time after transmitting the alert information to another measuring device, it may transmit a disaster signal or the alert information to a terminal within a predetermined distance using a short-range communication method.

That is, in a disaster situation where communication with the control server is not possible, the control module 140 may transmit a disaster signal or the alert information to a terminal within a predetermined range via the second communication module 130.

For example, if the control module 140 fails to receive a response from the control server within a predetermined time after transmitting the alert information to another measuring device, it may transmit a disaster signal or the alert information to a terminal within a predetermined range via the first communication module 120 using a long-range communication method.

In this case, the terminal that receives the disaster signal may switch to a slave mode and perform a role of transmitting and receiving the disaster signal or alert information.

Here, the terminal switched to the slave mode may operate as a slave device that performs information delivery and relaying within a communication network in which the measuring device 10 functions as a master, by transmitting the disaster signal or the alert information to the control server 20, a nearby measuring device, or another terminal.

The first communication module 120 and the second communication module 130 may be communication devices for communicating with external devices outside the measuring device 10.

The first communication module 120 may be a module that performs information communication with the control server. In other words, the first communication module 120 may be a module that communicates with the control server.

The first communication module 120 may be communicatively connected to the control server through a long-range communication method.

For example, the first communication module 120 may include a 4G LTE, 5G, 6G, LTE-M, or LoRa module.

However, the types of modules included in the first communication module 120 are not limited thereto and may be variously modified as would be apparent to those skilled in the art.

The first communication module 120 may be activated by the control module 140 when the surrounding information received from the sensing module 110 satisfies a predefined alert condition.

The activated first communication module 120 may attempt to communicate directly with the control server when it receives the alert information from the control module 140.

The first communication module 120 may transmit the alert information when communication with the control server is established.

After transmitting the alert information to the control server, the first communication module 120 may receive acknowledgment information from the control server.

Additionally, when communication with the control server is established and the first communication module 120 receives the acknowledgment information from the control server, the first communication module 120 may continuously receive surrounding information from the control module 140 and/or the sensing module, and periodically transmit disaster-related data to the control server.

The second communication module 130 may be a module that performs information communication with adjacent measuring devices and communicable terminals. In other words, the second communication module 130 may be a module that communicates with adjacent measuring devices and communicable terminals.

The second communication module 130 may be communicatively connected to other measuring devices and communicable terminals via a short-range communication method.

The second communication module 130 may include an NB-IoT module, a UWB module, or a LoRa module.

For example, the second communication module 130 may be a module configured to perform local communication.

For example, the second communication module 130 may include an NB-IoT module which, when compatible with the first communication module 120 and the first communication module 120 is activated, enables low-power communication with the second communication modules of other measuring devices, the control server, or terminals over a range of 1 km to 2 km in areas with many communication obstacles, and up to 10 km in open areas.

For example, the second communication module 130 may include a LoRa module, and through the LoRa module, long-range low-power communication may be possible, enabling communication with second communication modules of other measuring devices, the control server, or terminals over a range of 1 km to 3 km in areas with many communication obstacles, and up to 8 km in open areas.

For example, the second communication module 130 may include at least one of an NB-IoT module, a UWB module, or a LoRa module.

However, the types of modules included in the second communication module 130 are not limited thereto and may be variously modified as would be apparent to those skilled in the art.

The second communication module 130 may be activated by the control module 140 when the surrounding information received from the sensing module 110 satisfies a predefined alert condition.

The activated second communication module 130 may transmit the alert information to another measuring device when it receives the alert information from the control module 140.

The second communication module 130 may transmit the alert information to another measuring device when the first communication module 120 fails to communicate with the control server.

For example, if the surrounding information received from the sensing module 110 satisfies a predefined alert condition and also satisfies a predefined sleep condition, only the second communication module 130 may be activated, and the measuring device 10 may function solely as a relay to transmit the alert information to another measuring device.

The other measuring device may receive the alert information through its own second communication module 130, and may attempt to communicate directly with the control server through its own first communication module 120.

That is, when the measuring device 10 fails to establish communication with the control server, it may attempt to communicate with the control server through a nearby measuring device.

Here, the term "nearby measuring device" may refer to a measuring device that is located closest to a reference measuring device.

When communication with the control server also fails in another measuring device, the second communication module 130 of the other measuring device may transmit the alert information to the second communication module of yet another measuring device.

Such communication attempts may be repeated until one of the measuring devices 10 successfully establishes communication with the control server.

The second communication module 130 of a measuring device 10 that has successfully established communication with the control server may transmit completion information, which indicates that communication with the control server has been successful, to nearby measuring devices 10 of the measuring device 10.

The completion information may be transmitted among measuring devices 10 operating in the active mode via the second communication module 130, thereby notifying that there exists a measuring device 10 that has successfully established communication with the control server, and at the same time, causing the measuring devices 10 that receive the completion information to stop transmitting the alert information to any additional measuring devices 10.

The completion information may include communication device information identifying the measuring device that successfully communicated with the control server, an identification number (identification code) identifying the measuring device that sensed the confirmation information, and an identification number (identification code) of another measuring device that transmitted the confirmation information.

A detailed description of the acknowledgment information will be provided below.

The second communication module 130 of the measuring device 10 may receive a disaster signal from the control module 140 and transmit the disaster signal to a terminal within a predetermined distance via a short-range communication method, if communication between the measuring device 10 and the control server is not established within a predetermined time after the alert information is transmitted to another measuring device.

For example, the predetermined time may be 3 minutes, and the predetermined distance may be 1 km.

The power module 150 may supply electrical energy to the sensing module 110, the first communication module 120, the second communication module 130, and the control module 140.

For example, the power module 150 may be a battery.

The amount of electrical energy delivered by the power module 150 to each module may vary depending on an operating mode of the measuring device 10.

For example, the total amount of electrical energy delivered to each module by the power module 150 may be the least in the deep sleep mode, the greatest in the active mode, and an intermediate amount in the sleep mode.

For example, when the measuring device 10 is in the active mode, the power module 150 may supply electrical energy to all modules.

For example, when the measuring device 10 is in the sleep mode, the power module 150 may not supply electrical energy to the first communication module 120, but may supply electrical energy to the other modules excluding the first communication module 120.

For example, when the measuring device 10 is in the deep sleep mode, the power module 150 may not supply electrical energy to the first communication module 120, may supply only enough electrical energy to the second communication module 130 to receive alert information from another measuring device, and may supply electrical energy to the sensing module 110 and the control module 140.

The power module 150 may transmit information regarding the amount of stored electrical energy to the control module 140.

The housing unit 160 may form an external structure of the measuring device 10.

The housing unit 160 may provide the overall frame of the measuring device 10, and various modules may be embedded inside, serving to protect and mount the modules.

The sensing module 110, the first communication module 120, the second communication module 130, and the control module 140 may be connected within the housing unit 160.

For example, at least one of the sensing module 110, the first communication module 120, and the second communication module 130 may be exposed to an outside on the exterior of the housing unit 160.

In addition, the housing unit 160 may include the power module 150.

Each of the modules may be a type of computing device, which may include a processor, secondary storage, main memory, and/or network I/O devices.

The housing unit 160 may be placed at an arbitrary location.

Hereinafter, an operation among the components of the measuring device will be described in detail.

Figure 3:
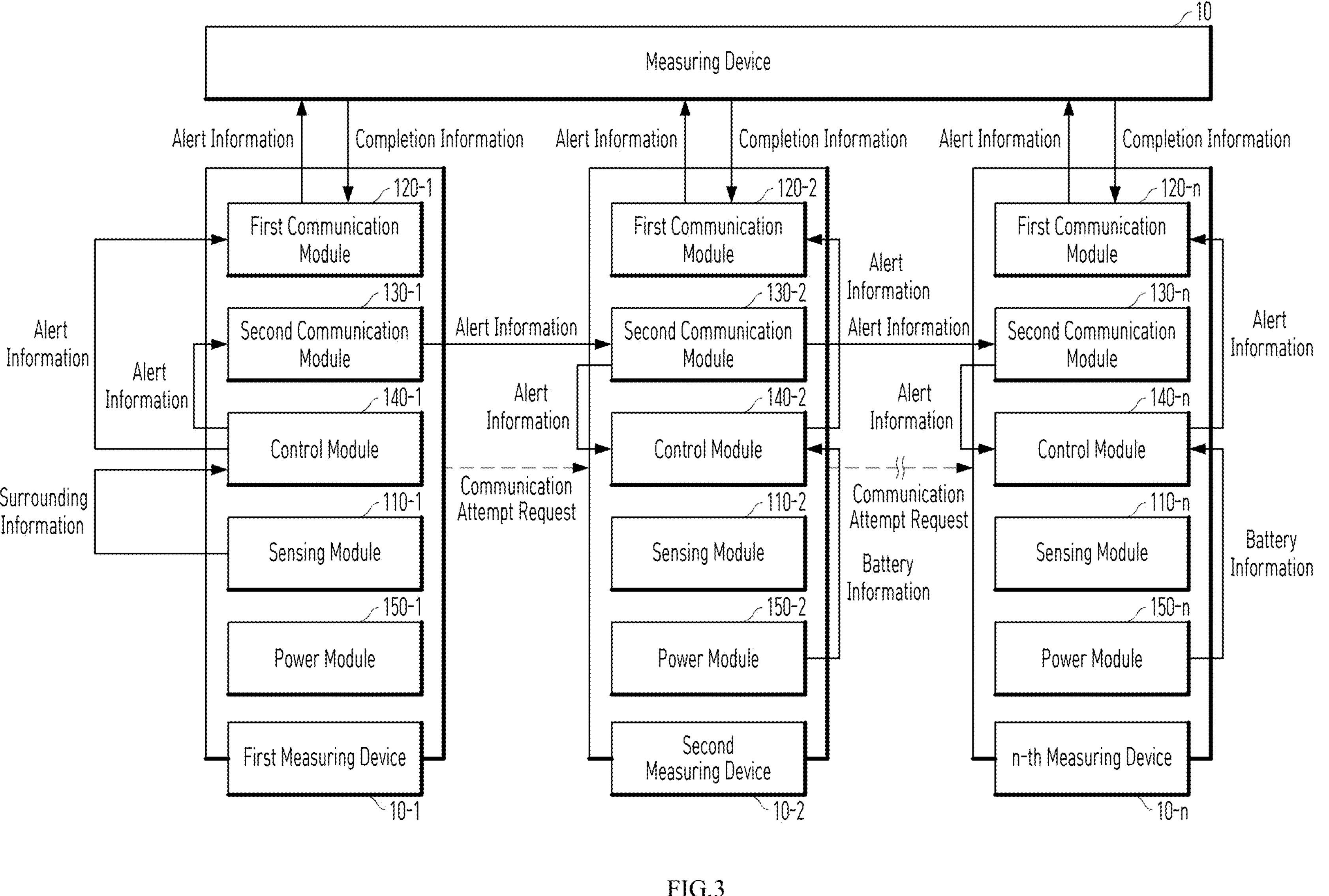
FIG. 3 is an operational diagram illustrating interactions among the components of the measuring device according to an embodiment of the present invention.

FIG. 3 is an operation diagram illustrating interactions among the components of the measuring device according to an embodiment of the present invention.

Referring to FIG. 3, the sensing module 110-1 of the first measuring device 10-1 may sense surrounding information, which is information related to surrounding conditions.

The sensing module 110-1 may transmit the surrounding information to the control module 140-1.

The control module 140-1 may determine whether the received surrounding information satisfies a predefined alert condition.

If the received surrounding information satisfies the predefined alert condition, the control module 140-1 of the first measuring device 10-1 may change the first measuring device 10-1, which is operating in the deep sleep mode, to the active mode according to a predefined control method.

The control module 140-1 of the first measuring device 10-1 may change the mode of the first measuring device 10-1 from the deep sleep mode to the active mode by activating the first communication module 120-1 and the second communication module 130-1 of the first measuring device 10-1.

If the received surrounding information satisfies the predefined alert condition, the control module 140-1 of the first measuring device 10-1 may transmit confirmation information, which is the surrounding information that satisfies the predefined alert condition, and identification information for identifying the first measuring device 10-1, to the first communication module 120-1 of the first measuring device 10-1.

The first communication module 120-1 of the first measuring device 10-1 may attempt communication with the control server 20 in order to transmit the alert information to the control server 20.

If the first communication module 120-1 successfully communicates with the control server 20, the control server 20 may transmit completion information to the first communication module 120-1.

If the first communication module 120-1 fails to communicate with the control server 20, the control module 140-1 may transmit the alert information to the second communication module 130-1.

The second communication module 130-1 of the first measuring device 10-1, which has received the alert information, may transmit the alert information to the second communication module 130-2 of the second measuring device 10-2, thereby sending a communication attempt request to the second measuring device 10-2.

The second communication module 130-2 of the second measuring device 10-2, which has received the alert information, may transmit the alert information to the control module 140-2 of the second measuring device 10-2.

The control module 140-2 of the second measuring device 10-2, which has received the alert information, may change the operation mode of the second measuring device 10-2 from the deep sleep mode to the active mode, thereby activating the first communication module 120-2 and the second communication module 130-2 of the second measuring device 10-2.

The first communication module 120-2 of the second measuring device 10-2, which has received the alert information, may attempt communication with the control server 20 to transmit the alert information to the control server 20.

If the first communication module 120-2 of the second measuring device 10-2 successfully communicates with the control server 20, the control server 20 may transmit completion information to the first communication module 120-2 of the second measuring device 10-2.

In this case, the second measuring device 10-2 may function as a relay between the first measuring device 10-1 and the control server 20, and the first measuring device 10-1 may continuously collect disaster-related data and transmit the data to the control server 20 through the second measuring device 10-2.

If the first communication module 120-2 of the second measuring device 10-2 fails to communicate with the control server 20, the control module 140-2 of the second measuring device 10-2 may transmit the alert information to the second communication module 130-2.

In this case, the alert information transmitted from the control module 140-2 to the second communication module 130-2 of the second measuring device 10-2 may further include, as intermediary information, information about the second measuring device 10-2 that transmitted the confirmation information up to that point.

The second communication module 130-2 of the second measuring device 10-2, which has received the alert information, may transmit the alert information to the second communication module of a third measuring device, thereby sending a communication attempt request to the third measuring device.

In this manner, communication attempts may be made up to the nth level until any of the measuring devices successfully establishes communication with the control server 20.

As the alert information is cumulatively transmitted from the second measuring device 10-2 to the nth measuring device 10-*n*, the intermediary information may be continuously accumulated as information about other measuring devices that have transmitted the confirmation information.

In addition, a measuring device that has successfully established communication with the control server 20 and received completion information may transmit the completion information to nearby other measuring devices via its second communication module, and the sequence of communication attempts up to the nth measuring device, which continues until one of the measuring devices successfully establishes communication with the control server 20, may further continue until all of the measuring devices have received the completion information.

Hereinafter, a structure of a packet through which the alert information or the completion information is transmitted will be described in detail.

Figure 4:
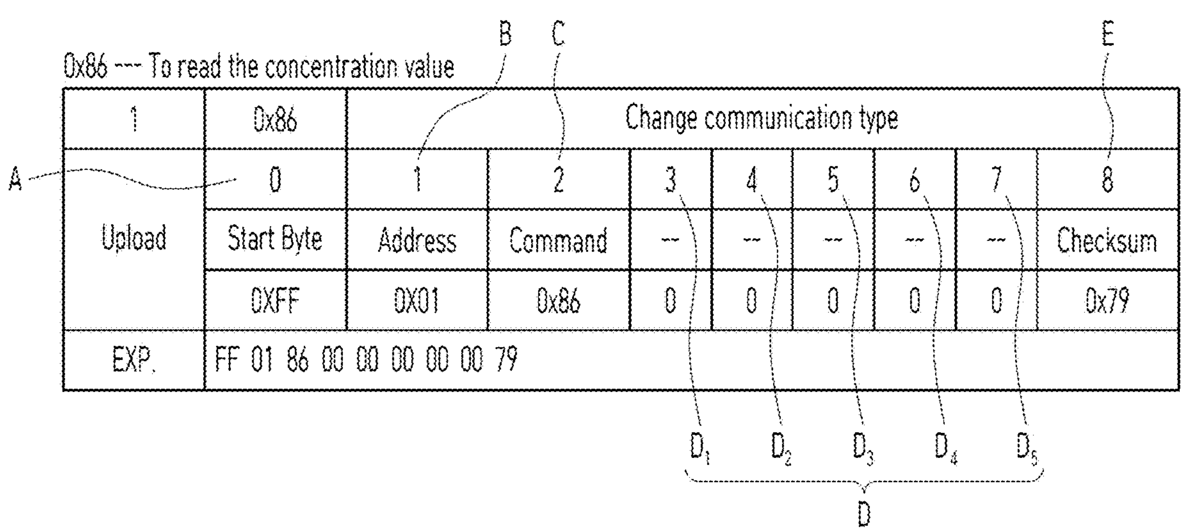
FIG. 4 is a diagram illustrating the structure of a packet through which alert or acknowledgment information is transmitted according to an embodiment of the present invention.

FIG. 4 is a diagram illustrating the structure of a packet through which the alert information or the completion information is transmitted.

Referring to FIG. 4, the alert information may be packet data capable of operating as a trigger.

The alert information may serve as a trigger such that, when a measuring device operating in the sleep mode or deep sleep mode receives the alert information, it switches to and operates in the active mode.

The alert information may include confirmation information, which is surrounding information satisfying a predefined alert condition; identification information for identifying the measuring device that sensed the confirmation information; and intermediary information regarding another measuring device that transmitted the confirmation information.

The confirmation information may be information measured at the time when the surrounding information satisfying the predefined alert condition is sensed by the measuring device.

A detailed description of the confirmation information may be omitted to the extent that it overlaps with the description given above.

The identification information may be information for identifying the measuring device that sensed the confirmation information.

The identification information may be information that enables distinction of which measuring device detected the corresponding alert when multiple measuring devices detect the same alert condition simultaneously, thereby allowing the alert to clearly identify the device and enabling systematic management of data generated from multiple measuring devices.

For example, each measuring device on the network may have a unique identification number, and such identification number may be included when transmitting the alert information, which may help to determine which measuring device generated the alert information.

The identification information may be used by the control server to accurately track from which device the alert information originated.

The identification number of the measuring device may be a number that is distinguishable for each measuring device, and may be individually assigned to each of the measuring devices according to the total number of installed measuring devices.

For example, when measuring devices exist from a first measuring device to an nth measuring device, the identification number of each measuring device may be a number assigned individually to each measuring device, ranging from 01 to n.

The intermediary information may be additional information included when the alert information is transmitted to another measuring device, and may be information about which measuring device transmitted the alert information, or information about other measuring devices that relayed or forwarded the alert information to the control server.

The intermediary information may be information in which the identification numbers of the measuring devices that relayed the alert information are sequentially recorded.

The intermediary information may first include the identification number of the measuring device that initially relayed the alert information, and thereafter, the identification numbers of other measuring devices through which the alert information has passed may be sequentially recorded.

For example, when the alert information is transmitted from the measuring device that sensed the confirmation information to another measuring device, no identification number may be included in the intermediary information of the alert information. However, when the measuring device that first received the alert information from the measuring device that sensed the confirmation information transmits the alert information to yet another measuring device, the identification number of the measuring device that first received the alert information may be included in the intermediary information of the alert information.

In addition, each time the alert information is transmitted from one measuring device to another, the intermediary information may sequentially include the identification numbers of the measuring devices along the transmission path of the alert information.

Referring to FIG. 4, the alert information may be transmitted in the form of a packet.

The packet may include: a trigger field A that indicates the start of the packet; an address field B for the identification number of the measuring device transmitting the packet; a command field C that instructs the operation to be performed by the receiving device; and an integrity field E for verifying the integrity of the packet.

The alert information may be included in the packet as an information field D, which is located between the command field C and the integrity field E, and may contain detailed information such as the confirmation information, the identification information, and the intermediary information.

The trigger field A may include specific start bytes that function as a trigger for emergency situations.

For example, other recognition bytes such as 0x77 or 0x38F, which are values obtained by converting 119 or 911 into hexadecimal, may function as a trigger for emergency situations as trigger information A.

Specifically, when other recognition bytes such as 0x77 or 0x38F are used in the trigger field A of the alert information, a nearby terminal that receives the alert information may switch to a slave mode regardless of a presence of the control server.

In this case, the terminal switched to the slave mode may allocate a predetermined proportion of its resources to the transmission and reception of the alert information or the completion information.

The terminal switched to the slave mode may operate as a slave device that performs information delivery and relaying within a communication network in which the measuring device operates as a master device.

In other words, the terminal switched to the slave mode by the command of the measuring device may transmit the alert information and/or the confirmation information to the control server.

The measuring device operating as a master device may be the measuring device that sensed the confirmation information. Additionally, the measuring device operating as a master device may be a device that received the confirmation information transmitted from another measuring device.

The measuring device operating as a master device may also be transmitting the alert information in real time to at least one terminal operating as a slave device.

When the measuring device successfully communicates with the control server by transmitting the alert information to the control server, the control server may transmit completion information to the measuring device.

The completion information may include communication device information for identifying the measuring device that successfully communicated with the control server, an identification number for identifying the measuring device that sensed the confirmation information, and an identification number for another measuring device that transmitted the confirmation information.

The communication device information may be an identification number of the measuring device that successfully communicated with the control server.

The communication device information may refer to a unique number or ID capable of identifying a specific device that successfully communicated with the control server and transmitted the alert information to the control server.

The identification number for identifying the measuring device that sensed the confirmation information and is included in the completion information may be the same as the identification information of the alert information.

In addition, the identification number for another measuring device that transmitted the confirmation information and is included in the completion information may be the same as the intermediary information of the alert information.

Referring to FIG. 4, the completion information may be transmitted in the form of a packet.

The packet may include: a trigger field A that indicates the start of the packet; an address field B for the identification number of the measuring device transmitting the packet; a command field C that instructs the operation to be performed by the receiving device; and an integrity field E for verifying the integrity of the packet.

In this case, the completion information may be included in the packet as an information field D, which is located between the command field C and the integrity field E, and may contain detailed information including the communication device information, the identification number for identifying the measuring device that sensed the confirmation information, and the identification number for another measuring device that transmitted the confirmation information.

Figure 5:
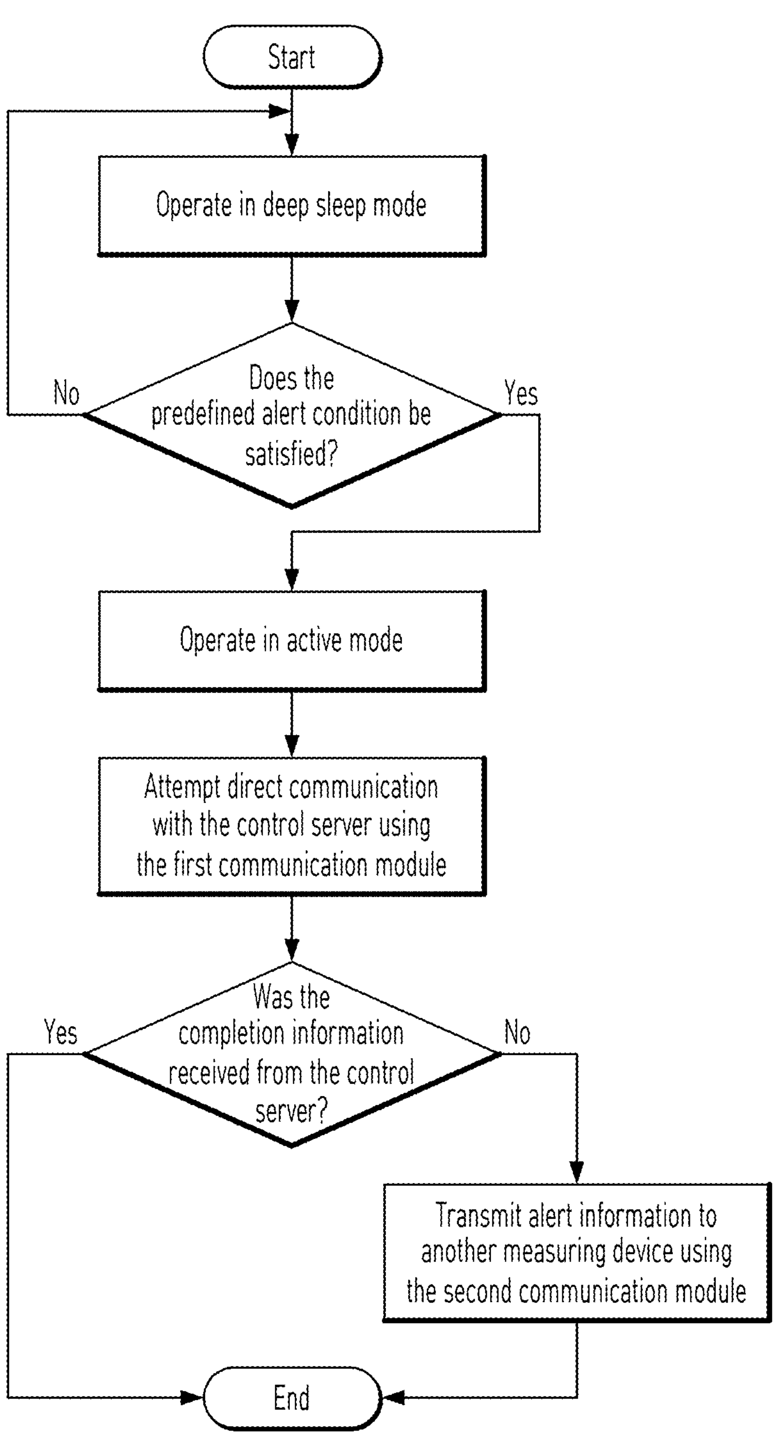
FIGS. 5 and 6 are diagrams illustrating predefined control methods implemented by the control module of the measuring device according to an embodiment of the present invention.
Figure 6:
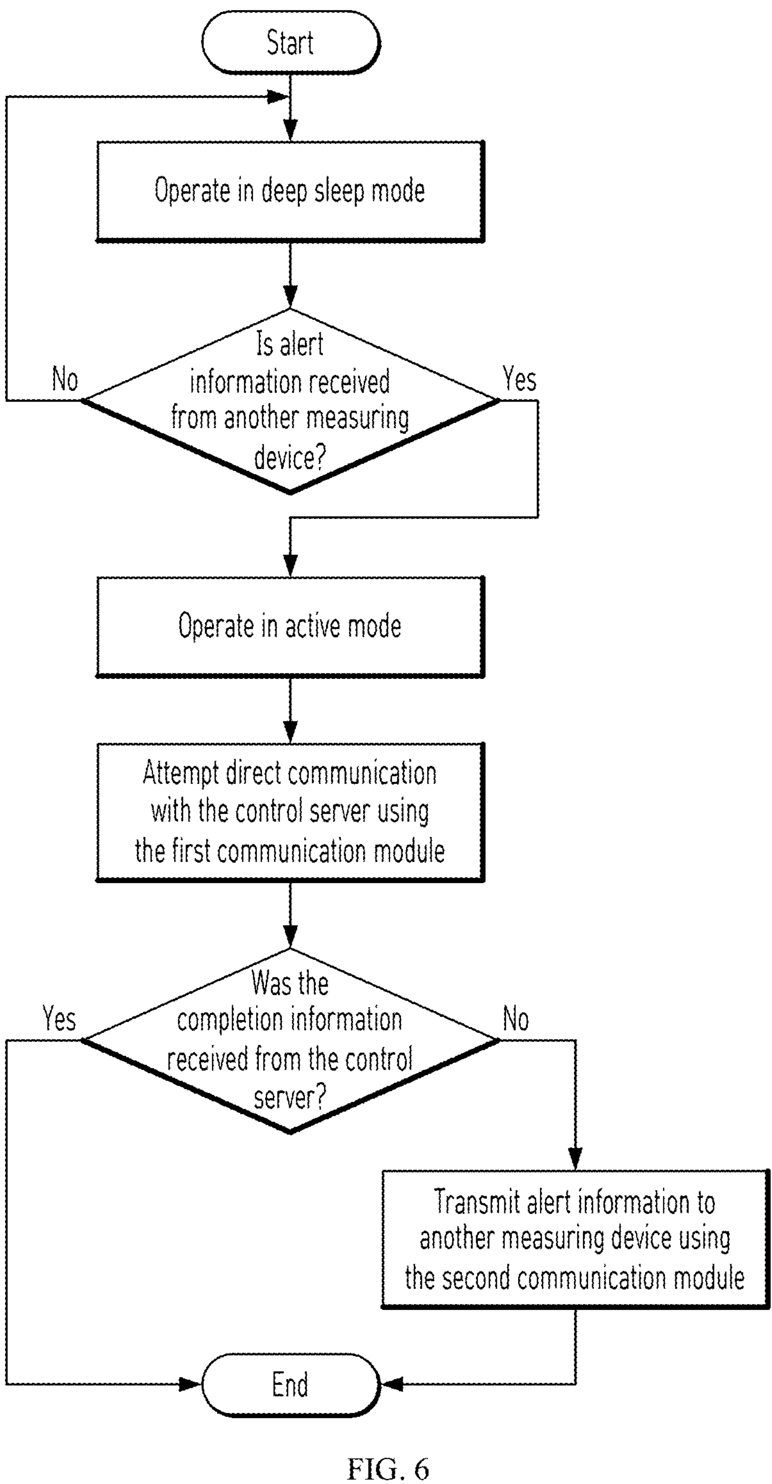

FIGS. 5 and 6 are diagrams illustrating a predefined control method implemented by the control module of the measuring device according to an embodiment of the present invention.

Specifically, FIG. 5 is a diagram illustrating the predefined method implemented by the control module of the measuring device that generates the alert information, and FIG. 6 is a diagram illustrating the predefined method implemented by the control module of the measuring device that receives the alert information.

Hereinafter, the predefined control method will be described in detail.

Referring to FIG. 5, in a deep sleep mode in which both the first communication module and the second communication module are deactivated, the sensing module may be sensing surrounding information, which is information related to surrounding conditions.

If the surrounding information does not satisfy a predefined alert condition, the control module may maintain the deep sleep mode, and the sensing module may continue sensing the surrounding information.

If the surrounding information satisfies the predefined alert condition, the control module may switch from the deep sleep mode to the active mode in which both the first communication module and the second communication module are activated.

The activated first communication module may attempt to communicate directly with the control server.

If the first communication module that attempted communication with the control server receives the completion information from the control server, the predefined control method may be terminated.

The predefined control method may be a method in which the first communication module first proactively attempts direct communication with the control server, and if direct communication with the control server is not possible, the first communication module or the second communication module is controlled so that communication with the control server is established through another measuring device.

If the first communication module that attempted communication with the control server does not receive the completion information from the control server, the activated second communication module may transmit the alert information to a nearby other measuring device.

When the second communication module receives the alert information, the control module of the other measuring device may activate the deactivated first communication module so as to transmit the alert information directly to the control server.

In this case, the alert information transmitted from the measuring device to the other measuring device may function as a trigger signal to activate the other measuring device from the deep sleep mode to the active mode.

Hereinafter, a predefined control method for when a measuring device receives alert information from another measuring device will be described in detail.

Referring to FIG. 6, in a deep sleep mode in which the first communication module and the second communication module of the measuring device are deactivated, the sensing module may be sensing surrounding information, which is information related to surrounding conditions.

When the measuring device is sensing surrounding information in the deep sleep mode and receives alert information from another measuring device, the measuring device may switch from the deep sleep mode to the active mode.

That is, when the second communication module receives the alert information, the control module may activate the deactivated first communication module so as to transmit the alert information directly to the control server.

The activated first communication module may attempt to communicate directly with the control server.

If the first communication module that attempted communication with the control server receives the completion information from the control server, the predefined control method may be terminated.

If the first communication module that attempted communication with the control server does not receive the completion information from the control server, the activated second communication module may transmit the alert information to a nearby other measuring device.

That is, when the measuring device fails to communicate directly with the control server, it may transmit the alert information received from another measuring device to a further nearby measuring device.

In this case, since the second communication module of the further measuring device receives the alert information, the control module of the further measuring device may activate the deactivated first communication module so as to transmit the alert information directly to the control server, and the activated first communication module may attempt to communicate directly with the control server.

The predefined control method may be terminated when the measuring device transmits the alert information to another measuring device via the second communication module, and the predefined control method may begin at the other measuring device that has received the alert information.

That is, the alert information may continue to be transmitted from one measuring device to another until a measuring device or another measuring device that successfully communicates directly with the control server appears.

In addition, the measuring devices that have received the alert information and are operating in the active mode may continuously attempt communication with the control server.

At this time, a measuring device that establishes communication with the control server by transmitting the alert information to the control server may receive completion information from the control server.

The measuring device that receives the completion information may transmit the completion information to nearby other measuring devices, and a measuring device that receives the completion information from another measuring device may also transmit the completion information to further nearby measuring devices.

Measuring devices operating in the active mode and attempting communication with the control server may, upon receiving the completion information from another measuring device, switch from the active mode to the sleep mode if the identification number in the completion information does not match the identification number of the measuring device that received the completion information. In this case, the first communication module may be deactivated simultaneously with the transition to the sleep mode, thereby terminating the attempt to communicate with the control server.

Hereinafter, a predefined control method implemented by the control module of the measuring device according to an embodiment of the present invention will be described in detail through an example.

Figure 7:
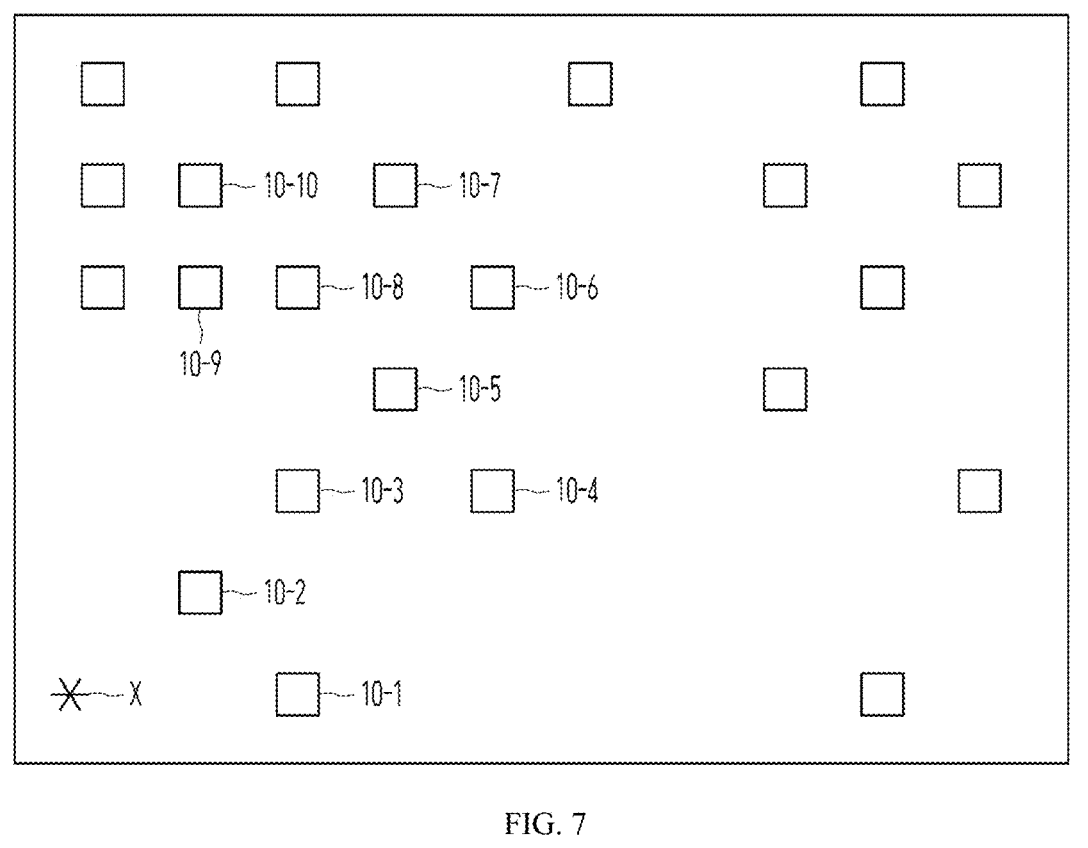

FIG. 7 is a diagram for illustrating an example of a predefined control method implemented by a control module of a measuring device according to an embodiment of the present invention.

Referring to FIG. 7, a disaster may have occurred at location X, and a second measuring device 10-2 located near X may have sensed the disaster.

The second measuring device 10-2 may operate in an active mode by sensing surrounding information that satisfies a predefined alert condition.

The second measuring device 10-2 may attempt to communicate with a control server via a first communication module.

If the second measuring device 10-2 fails to communicate with the control server, it may have transmitted alert information to a first measuring device 10-1 and a third measuring device 10-3 located nearby via a second communication module.

The first measuring device 10-1 and the third measuring device 10-3 may have switched from a deep sleep mode to an active mode by receiving the alert information from the second measuring device 10-2.

The first measuring device 10-1 and the third measuring device 10-3, operating in the active mode, may attempt to communicate with the control server.

If the first measuring device 10-1 fails to communicate with the control server and no other measuring device in a deep sleep mode exists within a nearby distance, it may be unable to transmit the alert information to another measuring device, and may continue to repeatedly attempt communication with the control server.

For example, the nearby distance may be 100 meters, such that the distance between a first measuring device 10-1 and a second measuring device 10-2 may be 80 meters, and the distance between the first measuring device 10-1 and a third measuring device 10-3 may be 140 meters.

If the third measuring device 10-3 fails to communicate with the control server, it may transmit the alert information to a fourth measuring device 10-4 and a fifth measuring device 10-5.

The fourth measuring device 10-4 and the fifth measuring device 10-5 that have received the alert information may have switched from a deep sleep mode to an active mode.

The fourth measuring device 10-4 and the fifth measuring device 10-5, now operating in the active mode, may attempt to communicate with the control server.

Since no measuring device in a deep sleep mode exists within a nearby distance, if the fourth measuring device 10-4 fails to communicate with the control server, it may not be able to transmit the alert information to another measuring device and may continue to repeatedly attempt communication with the control server.

If the fifth measuring device 10-5 fails to communicate with the control server, it may transmit the alert information to a sixth measuring device 10-6 and an eighth measuring device 10-8.

The sixth measuring device 10-6 and the eighth measuring device 10-8 that have received the alert information may have switched from a deep sleep mode to an active mode.

The sixth measuring device 10-6 and the eighth measuring device 10-8, now operating in the active mode, may attempt to communicate with the control server.

If the eighth measuring device 10-8 fails to communicate with the control server, it may transmit the alert information to a ninth measuring device 10-9 and a tenth measuring device 10-10.

In this case, if the ninth measuring device 10-9 succeeds in communicating with the control server, the ninth measuring device 10-9 may have received completion information from the control server.

The ninth measuring device 10-9 that has received the completion information may transmit the completion information to nearby measuring devices in order to notify them that communication with the control server has been successfully established.

Among the measuring devices located near the ninth measuring device 10-9, only the eighth measuring device 10-8 and the tenth measuring device 10-10 may be operating in either the active mode or the sleep mode, and thus the completion information may be transmitted only to the eighth measuring device 10-8 and the tenth measuring device 10-10.

The eighth measuring device 10-8 that has received the completion information, which is also operating in the active mode, may transmit the completion information to a seventh measuring device 10-7 and a fifth measuring device 10-5, which are its neighboring devices.

The completion information may be transmitted and received among all measuring devices operating in either the active mode or the sleep mode.

The measuring devices that have received the completion information may stop attempting communication with the control server, and as a result, a communication path between the second measuring device 10-2 and the ninth measuring device 10-9 may be established through the third measuring device 10-3, the fifth measuring device 10-5, and the eighth measuring device 10-8, such that the communication between the control server connected to the ninth measuring device 10-9 and the second measuring device 10-2 may be relayed.

After the disaster situation is resolved, the measuring devices operating in the active mode may be switched to the sleep mode by the control server. If surrounding information satisfying a predefined alert condition is not sensed during a predetermined period in which the measuring devices operate in the sleep mode, the measuring devices may be switched to the deep sleep mode.

Hereinafter, a predefined control method performed by the control module of the measuring device according to another embodiment of the present invention will be described in detail.

Figure 8:
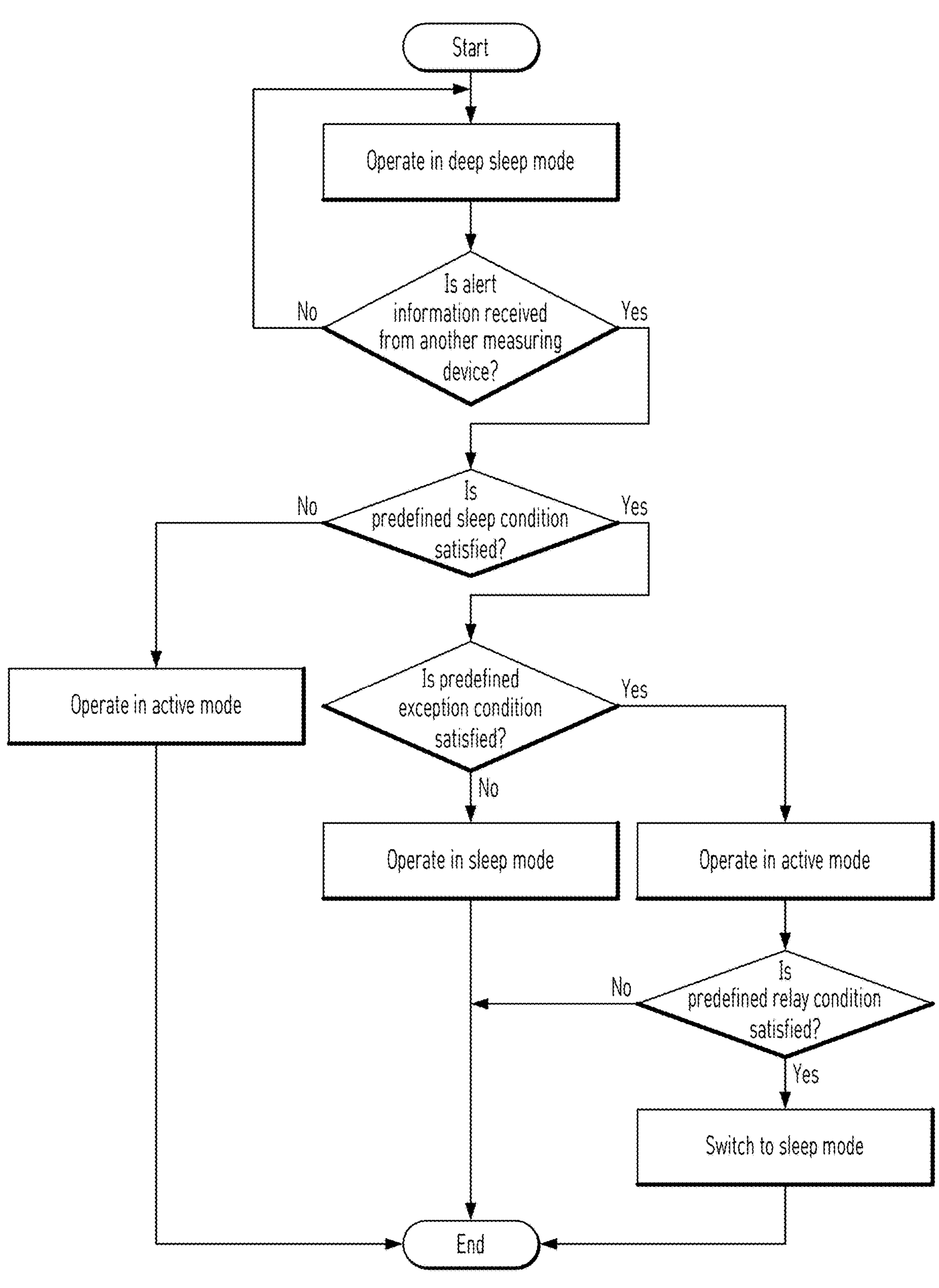
FIG. 8 is a diagram illustrating another predefined control method implemented by the control module of the measuring device according to another embodiment of the present invention.

FIG. 8 is a diagram illustrating a predefined control method implemented by the control module of a measuring device according to another embodiment of the present invention.

Referring to FIG. 8, when the measuring device is in a deep sleep mode in which the first communication module and the second communication module are deactivated, the sensing module may be sensing surrounding information, which is information related to surrounding conditions.

When the measuring device is sensing surrounding information in the deep sleep mode and receives alert information from another measuring device, the control module may determine whether a predefined sleep condition is satisfied.

The control module may receive information on a remaining battery level from the power module and determine whether the battery level is below a predetermined threshold.

In addition, the control module may determine, based on the intermediary information included in the received alert information, whether the number of other measuring devices that transmitted the confirmation information is less than or equal to a predetermined threshold.

The predefined sleep condition may be a condition in which both the amount of stored electric energy in the power module is below a predetermined threshold and the number of other measuring devices that transmitted the confirmation information is less than or equal to the predetermined threshold.

For example, the predetermined threshold for the amount of stored electric energy in the power module may be 30% of the total storable electric energy.

For example, the predetermined threshold for the number of other measuring devices that have transmitted the confirmation information may be three.

However, the predetermined threshold for the electric energy in the predefined sleep condition and the predetermined threshold for the number of other measuring devices that have transmitted the confirmation information are not limited thereto and may be variously modified as would be apparent to those skilled in the art.

If the predefined sleep condition is not satisfied, the control module may switch the operation of the measuring device from the deep sleep mode to the active mode.

For example, when the control module receives alert information from another measuring device, it may switch from the deep sleep mode to the active mode, and if the predefined sleep condition is satisfied, it may switch from the active mode to the sleep mode.

When the control module receives the alert information from another measuring device, even if the predefined sleep condition is satisfied, the control module may switch from the deep sleep mode to the active mode if a predefined exception condition, which is determined based on weather considerations, is satisfied.

If the predefined sleep condition is satisfied, the control module may determine whether to switch the measuring device operating in the deep sleep mode to the sleep mode or to the active mode based on whether the predefined exception condition is satisfied.

The predefined exception condition may be determined in consideration of weather and may be a condition that considers the direction or speed of disaster spread.

The predefined exception condition may include at least one of the following: a first exception condition in which a relative humidity in the atmosphere is equal to or less than a first threshold; a second exception condition in which the relative humidity in the atmosphere is higher than the first threshold but equal to or less than a second threshold and an ambient temperature is equal to or greater than a predetermined temperature; and a third exception condition in which an average wind speed is equal to or greater than a predetermined speed.

If the predefined sleep condition is satisfied but the predefined exception condition is not satisfied, the control module may switch the mode from the deep sleep mode to the sleep mode.

If the predefined sleep condition and the predefined exception condition are both satisfied, the control module may switch the mode from the deep sleep mode to the active mode.

For example, when the relative humidity in the atmosphere is 20% or less, the control module may determine that the weather is dry and that the disaster is likely to spread rapidly, thereby satisfying the first exception condition, which results in satisfaction of the predefined exception condition.

As another example, when the relative humidity in the atmosphere is equal to or less than 30% and the temperature is equal to or greater than 25° C., the second exception condition may be satisfied, thereby satisfying the predefined exception condition.

For example, when the average wind speed is equal to or greater than 5 m/s, the third exception condition may be satisfied, thereby satisfying the predefined exception condition.

That is, the predefined exception condition may be a condition for more accurately determining and responding to the change in the scale and direction of a disaster, because there is a risk that the disaster may spread rapidly or accelerate.

The control module may switch the mode from the active mode to the sleep mode when the measuring device is operating in the active mode due to satisfaction of a predefined exception condition, and a predefined relay condition is satisfied.

The predefined relay condition may be a condition in which alert information having the same confirmation information is received a predetermined number of times or more.

For example, the predetermined number of times may be four, although the present invention is not limited thereto.

A measuring device that satisfies the predefined relay condition may be located in an area with a significant number of surrounding measuring devices and may be intended to operate as a relay for an extended period of time.

When the measuring device is operating in the active mode due to satisfaction of the predefined exception condition, and the predefined relay condition is not satisfied, the control module may maintain the active mode.

Hereinafter, a predefined control method implemented by the control module of the measuring device according to another embodiment of the present invention will be described in detail through an example.

Figure 9:
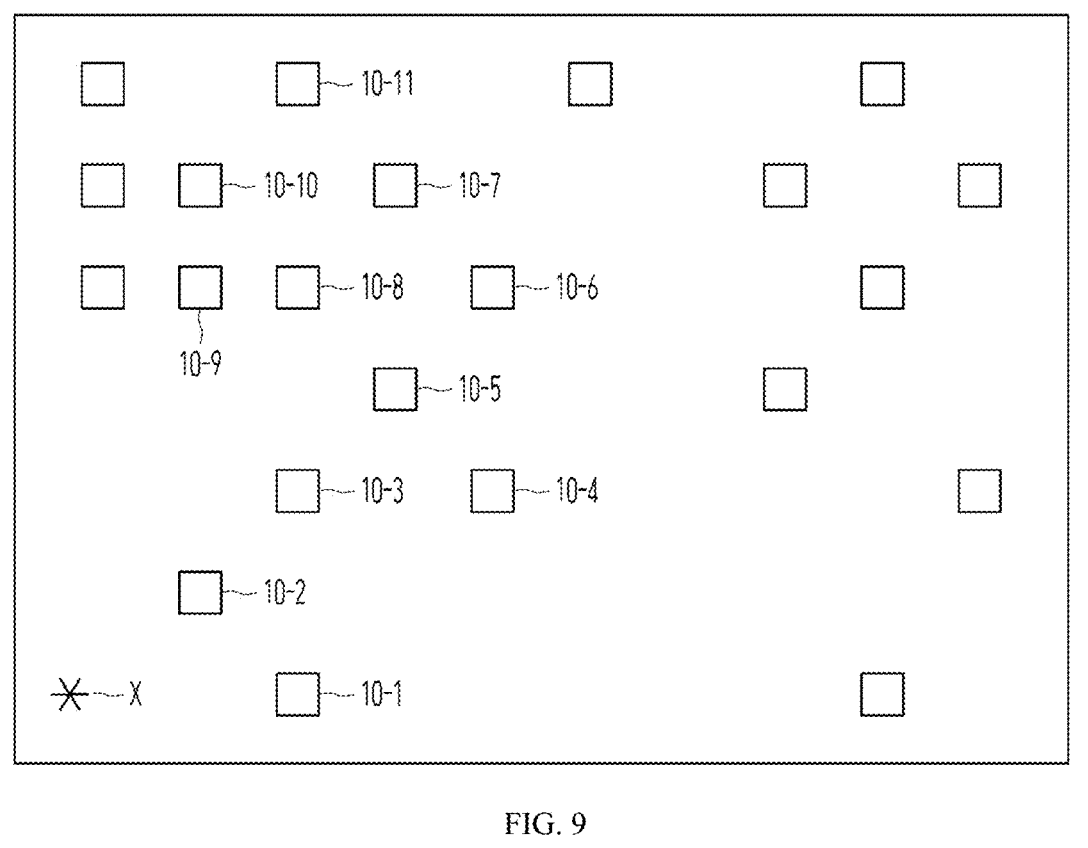

FIG. 9 is a diagram illustrating an example of a predefined control method implemented by the control module of a measuring device according to another embodiment of the present invention.

Referring to FIG. 9, a disaster may have occurred at location X, and a second measuring device 10-2 located close to X may have sensed it.

The second measuring device 10-2 may operate in the active mode by sensing surrounding information that satisfies a predefined alert condition.

The second measuring device 10-2 may attempt to communicate with the control server via the first communication module.

If the second measuring device 10-2 fails to communicate with the control server, it may transmit the alert information to an adjacent first measuring device 10-1 and third measuring device 10-3 via the second communication module.

The first measuring device 10-1 and the third measuring device 10-3 may have transitioned from the deep sleep mode to the active mode by receiving the alert information from the second measuring device 10-2.

The first measuring device 10-1 and the third measuring device 10-3, now operating in the active mode, may attempt to communicate with the control server.

If the first measuring device 10-1 fails to communicate with the control server, it may not be able to transmit the alert information to another measuring device since there is no measuring device in the deep sleep mode within an adjacent distance, and it may continuously repeat attempts to communicate with the control server.

For example, the adjacent distance may be 100 meters, and the distance between the first measuring device 10-1 and the second measuring device 10-2 may be 80 meters, while the distance between the first measuring device 10-1 and the third measuring device 10-3 may be 140 meters.

If the third measuring device 10-3 fails to communicate with the control server, it may transmit the alert information to a fourth measuring device 10-4 and a fifth measuring device 10-5.

The fourth measuring device 10-4 and the fifth measuring device 10-5, upon receiving the alert information, may have transitioned from the deep sleep mode to the active mode.

The fourth measuring device 10-4 and the fifth measuring device 10-5, now operating in the active mode, may attempt to communicate with the control server.

If the fourth measuring device 10-4 fails to communicate with the control server, it may not be able to transmit the alert information to another measuring device since there is no measuring device in the deep sleep mode within an adjacent distance, and it may continue to repeatedly attempt communication with the control server.

If the fifth measuring device 10-5 fails to communicate with the control server, it may transmit the alert information to a sixth measuring device 10-6 and an eighth measuring device 10-8.

The sixth measuring device 10-6 and the eighth measuring device 10-8, upon receiving the alert information, may have transitioned from the deep sleep mode to the active mode.

The sixth measuring device 10-6 and the eighth measuring device 10-8, now operating in the active mode, may attempt to communicate with the control server.

At this time, the first measuring device 10-1, the third measuring device 10-3 through the sixth measuring device 10-6, and the eighth measuring device 10-8 may each have received alert information from no more than three other measuring devices that transmitted confirmation information.

The number of other measuring devices that transmitted confirmation information may be one for the first measuring device 10-1 and the third measuring device 10-3, two for the fourth measuring device 10-4 and the fifth measuring device 10-5, and three for the eighth measuring device 10-8 and the sixth measuring device 10-6.

As a result, for the first measuring device 10-1, and the third to sixth measuring devices 10-3 through 10-6 and the eighth measuring device 10-8—each of which has received confirmation information from no more than three other measuring devices—the determination as to whether the predefined sleep condition is satisfied may depend on the amount of electrical energy stored in the power module.

If there exists a measuring device among the first measuring device 10-1, and the third to sixth measuring devices 10-3 through 10-6 and the eighth measuring device 10-8, whose stored electrical energy in the power module is below a predetermined threshold, the device may have transitioned from the deep sleep mode to the sleep mode—not to the active mode—when the alert information was received.

A measuring device that has transitioned to the sleep mode may not attempt communication with the control server, but may have served as a relay for communication between the second measuring device 10-2, which sensed the confirmation information, and the control server.

The seventh measuring device 10-7, whether it receives the alert information from the eighth measuring device 10-8 or from the sixth measuring device 10-6, may have received confirmation information from four other measuring devices. If it receives the alert information via the eighth measuring device 10-8 and the tenth measuring device 10-10, and from the eleventh measuring device 10-11, the number of other measuring devices that transmitted confirmation information becomes five, which exceeds the threshold of three. Therefore, the seventh measuring device 10-7 may transition from the deep sleep mode to the active mode regardless of the remaining battery level.

In this case, even if the predefined sleep condition is satisfied, the measuring device may switch to the active mode instead of the sleep mode if the predefined exception condition is satisfied.

For example, when the control module determines that the weather is dry, all measuring devices for which the predefined sleep condition is satisfied may operate in the active mode because the predefined exception condition is satisfied.

The control module may determine that the weather is dry when the humidity included in the confirmation information is equal to or less than a first threshold, or when the humidity and temperature included in the confirmation information are equal to or less than a second threshold and equal to or greater than a predetermined temperature, respectively.

For example, the first threshold may be a relative humidity in the atmosphere equal to or less than 20%.

For example, the second threshold may be a relative humidity in the atmosphere equal to or less than 30%, and the predetermined temperature may be equal to or greater than 25° C.

In addition, when the wind speed included in the confirmation information is equal to or greater than 5 m/s, all measuring devices for which the predefined sleep condition is satisfied may operate in the active mode because the predefined exception condition is satisfied.

The seventh measuring device 10-7, the ninth measuring device 10-9, and the tenth measuring device 10-10 may have been operating in the active mode from the moment the alert information was received, because the number of other measuring devices that transmitted the confirmation information exceeds the predetermined threshold of three, regardless of the path through which the confirmation information was received.

If the predefined exception condition is satisfied and the eighth measuring device 10-8 is operating in the active mode even though the predefined sleep condition is satisfied, the eighth measuring device 10-8 may be located on a path where it can receive alert information with the same confirmation information from the nearby measuring devices, namely, the fifth measuring device 10-5, the seventh measuring device 10-7, the ninth measuring device 10-9, and the tenth measuring device 10-10, and may receive such alert information four times.

That is, since the eighth measuring device 10-8 also satisfies the predefined relay condition, the third measuring device 10-5 may be operating in the sleep mode.

In addition, if the eighth measuring device 10-8 is also operating in the active mode because the predefined exception condition has been satisfied, the eighth measuring device 10-8 may receive alert information having the same confirmation information from the nearby measuring devices within a predetermined distance, including the fifth measuring device 10-5, the seventh measuring device 10-7, the ninth measuring device 10-9, and the tenth measuring device 10-10. As a result, since the predefined relay condition is also satisfied by the eighth measuring device 10-8, the third measuring device 10-8 may be operating in the sleep mode.

In addition, the second measuring device 10-2, as the device that sensed the confirmation information, may always be operating in the active mode.

The ninth measuring device 10-9 may have successfully communicated with the control server and may have received the completion information from the control server.

The ninth measuring device 10-9 that has received the completion information may transmit the completion information to nearby other measuring devices in order to inform them that communication with the control server has been successfully established.

The measuring devices in the active mode or the sleep mode among those adjacent to the ninth measuring device 10-9 may only include the eighth measuring device 10-8 and the tenth measuring device 10-10. Therefore, the completion information may be transmitted only to the eighth measuring device 10-8 and the tenth measuring device 10-10.

The eighth measuring device 10-8, which has received the completion information, may also be operating in the active mode and may transmit the completion information to the seventh measuring device 10-7 and the fifth measuring device 10-5, which are nearby measuring devices.

The completion information may be transmitted and received among all measuring devices operating in either the active mode or the sleep mode.

The measuring devices that have received the completion information may stop attempting to communicate with the control server. As a result, the third measuring device 10-3, the fifth measuring device 10-5, and the eighth measuring device 10-8, which form a communication path between the second measuring device 10-2 and the ninth measuring device 10-9, may relay communication between the second measuring device 10-2 and the control server that is in communication with the ninth measuring device 10-9.

The attached drawings illustrate the technical spirit of the present invention more clearly, and thus components irrelevant or less relevant to the technical spirit of the invention are simplified or omitted.

Although the configuration and features of the present invention have been described above based on certain embodiments, the present invention is not limited thereto, and various modifications and alterations within the spirit and scope of the invention will be apparent to those skilled in the art. Therefore, such modifications or alterations should be construed as being included in the scope of the appended claims.

What is claimed is:

1. A measuring device disposed at a designated location, which is an arbitrary place, comprising:

a sensing module configured to sense surrounding information, which is information related to surrounding conditions;

a first communication module configured to perform information communication with a control server;

a second communication module configured to perform information communication with another measuring device disposed within a predetermined distance from the designated location;

a control module configured to control the first communication module or the second communication module according to a predefined control method so that alert information is transmitted to the control server when the surrounding information satisfies a predefined alert condition; and a housing unit to which the sensing module, the first communication module, the second communication module, and the control module are connected, wherein the predefined control method is a method for controlling the first communication module or the second communication module to:

first preemptively communicate directly with the control server; and then communicate with the control server via another measuring device if direct communication with the control server is unavailable.

2. The measuring device of claim 1, wherein the control module activates the first communication module, which is deactivated, so as to directly transmit the alert information to the control server when the second communication module receives the alert information.

3. The measuring device of claim 1, wherein the control module controls the first communication module or the second communication module according to the predefined control method when the second communication module receives the alert information, and wherein the alert information includes:

identification information for identifying another measuring device that sensed confirmation information, which is the surrounding information satisfying the predefined alert condition, and intermediary information regarding another measuring device that transmitted the confirmation information.

4. A measuring device disposed at a designated location, which is an arbitrary place, comprising:

a sensing module configured to sense surrounding information, which is information related to surrounding conditions;

a first communication module configured to perform information communication with a control server;

a second communication module configured to perform information communication with another measuring device disposed within a predetermined distance from the designated location;

a control module configured to control the first communication module or the second communication module according to a predefined control method so that alert information is transmitted to the control server when the surrounding information satisfies a predefined alert condition; and a housing unit to which the sensing module, the first communication module, the second communication module, and the control module are connected, wherein the control module controls the first communication module and the second communication module in one of:

a deep sleep mode in which the first communication module is deactivated and the second communication module is in standby;

a sleep mode in which the first communication module is deactivated and the second communication module is activated; and an active mode in which both the first communication module and the second communication module are activated, wherein the control module switches from the deep sleep mode to the active mode when the surrounding information satisfies a predefined alert condition.

5. A measuring device disposed at a designated location, which is an arbitrary place, comprising:

a sensing module configured to sense surrounding information, which is information related to surrounding conditions;

a first communication module configured to perform information communication with a control server;

a second communication module configured to perform information communication with another measuring device disposed within a predetermined distance from the designated location;

a control module configured to control the first communication module or the second communication module according to a predefined control method so that alert information is transmitted to the control server when the surrounding information satisfies a predefined alert condition; and a housing unit to which the sensing module, the first communication module, the second communication module, and the control module are connected, wherein the control module controls the first communication module and the second communication module in one of:

a deep sleep mode in which the first communication module is deactivated and the second communication module is in standby;

a sleep mode in which the first communication module is deactivated and the second communication module is activated; and an active mode in which both the first communication module and the second communication module are activated, wherein the control module controls the sensing module such that a sensing period of the surrounding information in the sleep mode is shorter than that in the deep sleep mode, and switches from the active mode to the sleep mode when a predefined sleep condition is satisfied.

6. The measuring device of claim 1, wherein the control module transmits a disaster signal to a terminal within a predetermined distance via a short-range communication method if a response is not received from the control server within a predetermined time after the alert information is transmitted to another measuring device.

7. A measuring device disposed at a designated location, which is an arbitrary place, comprising:

a sensing module configured to sense surrounding information, which is information related to surrounding conditions;

a first communication module configured to perform information communication with a control server;

a second communication module configured to perform information communication with another measuring device disposed within a predetermined distance from the designated location;

a control module configured to control the first communication module or the second communication module according to a predefined control method so that alert information is transmitted to the control server when the surrounding information satisfies a predefined alert condition;

a housing unit to which the sensing module, the first communication module, the second communication module, and the control module are connected; and a power module disposed in the housing unit and configured to supply electrical energy to the sensing module, the first communication module, the second communication module, or the control module, wherein the control module controls the first communication module and the second communication module in one of:

a deep sleep mode in which the first communication module is deactivated and the second communication module is in standby;

a sleep mode in which the first communication module is deactivated and the second communication module is activated; and an active mode in which both the first communication module and the second communication module are activated, wherein the control module switches from the deep sleep mode to the active mode when the alert information is received from another measuring device, and switches from the deep sleep mode to the sleep mode when the predefined sleep condition is satisfied, even if the alert information is received from another measuring device.

8. The measuring device of claim 7, wherein the alert information includes:

identification information for identifying another measuring device that sensed confirmation information, which is the surrounding information satisfying a predefined alert condition; and intermediary information regarding another measuring device that transmitted the confirmation information, wherein the predefined sleep condition is a condition in which both electrical energy stored in the power module is less than or equal to a predetermined threshold, and the number of other measuring devices that transmitted the confirmation information is less than or equal to a predetermined number.

9. The measuring device of claim 8, wherein the control module switches from the deep sleep mode to the active mode when the alert information is received from another measuring device, even if the predefined sleep condition is satisfied, if a predefined exception condition determined in consideration of weather is satisfied.

10. A control system comprising:

a measuring device deployed at a designated location which is an arbitrary place; and a control server capable of communicating with a plurality of measuring devices, wherein the measuring device includes:

a sensing module configured to sense surrounding information related to surrounding conditions;

a first communication module configured to perform information communication with the control server;

a second communication module configured to perform information communication with another measuring device disposed within a predetermined distance from the designated location;

a control module configured to control the first communication module or the second communication module according to a predefined control method so that alert information is transmitted to the control server when the surrounding information satisfies a predefined alert condition; and a housing unit to which the sensing module, the first communication module, the second communication module, and the control module are connected, wherein the predefined control method is a method for controlling the first communication module or the second communication module to:

first preemptively communicate directly with the control server; and then communicate with the control server via another measuring device if direct communication with the control server is unavailable.

* * * * *